United States Patent [19]

Strobel

[11] 3,997,685

[45] * Dec. 14, 1976

[54] STABLE AROMA, FLAVOR AND AROMA AND FLAVOR PRODUCTS FROM AROMA- AND FLAVOR-BEARING SUBSTRATES

[75] Inventor: Rudolf Gottfried Karl Strobel, Cincinnati, Ohio

[73] Assignee: The Procter & Gamble Company, Cincinnati, Ohio

[ * ] Notice: The portion of the term of this patent subsequent to Feb. 20, 1990, has been disclaimed.

[22] Filed: Feb. 6, 1973

[21] Appl. No.: 330,143

Related U.S. Application Data

[63] Continuation-in-part of Ser. No. 158,590, June 30, 1971, Pat. No. 3,717,472.

[30] Foreign Application Priority Data

June 28, 1972 Italy ............................ 51207/72

[52] U.S. Cl. .................. 426/594; 426/597; 426/599; 426/650; 426/651; 426/655; 426/386; 426/431; 426/432; 426/435; 426/511; 23/267 C

[51] Int. Cl.[2] ................. A23F 1/08; A23N 1/00

[58] Field of Search .......... 426/193, 388, 312, 432, 426/354, 434, 384, 443, 385, 444–476, 511, 386, 431, 435, 594, 650, 595, 651, 597, 599, 655; 23/267 C

[56] References Cited

UNITED STATES PATENTS

| | | | |
|---|---|---|---|
| 2,155,971 | 4/1939 | Houseman | 426/432 X |
| 2,601,635 | 6/1952 | Romagnan | 23/267 C |
| 2,680,687 | 6/1954 | Lemmonier | 426/386 X |
| 3,021,218 | 2/1962 | Clinton et al. | 426/386 X |
| 3,132,947 | 5/1964 | Mahlmann | 426/386 |
| 3,243,264 | 3/1966 | Hickey | 23/267 C |
| 3,554,761 | 1/1971 | Carbonell | 426/386 X |
| 3,615,666 | 10/1969 | Schlichter | 426/386 |
| 3,653,910 | 4/1972 | Pitchon | 426/386 |
| 3,717,472 | 2/1973 | Strobel | 426/193 |
| 3,765,904 | 10/1973 | de Roissart | 426/384 |
| 3,800,055 | 3/1974 | Gallagher | 23/267 C X |

FOREIGN PATENTS OR APPLICATIONS 79,292 10/1962 France ............................ 426/386

*Primary Examiner*—Frank W. Lutter
*Assistant Examiner*—N. Greenblum
*Attorney, Agent, or Firm*—Louis G. Xiarhos

[57] ABSTRACT

Aroma- and flavor-bearing substrates are separated into an aroma concentrate and a flavor concentrate by pulsing or applying in a continuous fashion wet steam to a zone containing the substrate. The substrate-containing zone is held under vacuum pressure and the flavor concentrate is collected in a first trap, while an aroma concentrate is collected in a second trap. In one preferred embodiment, the most volatile flavor and aroma bodies are collected and subsequently dissolved in a solution of solids (e.g., those obtained from further extraction of the substrate) and the solution is then frozen and freeze-dried to yield a highly stable dry aroma and flavor bearing product. In a preferred embodiment, the substrate comprises either coffee or tea.

24 Claims, No Drawings

STABLE AROMA, FLAVOR AND AROMA AND FLAVOR PRODUCTS FROM AROMA- AND FLAVOR-BEARING SUBSTRATES

CROSS-REFERENCE TO RELATED APPLICATIONS

This application is a continuation-in-part of copending U.S. Pat. application Ser. No. 158,590, filed June 30, 1971, now U.S. Pat. No. 3717472

BACKGROUND OF THE INVENTION

Many food products and especially those from which extracts are made to produce beverages, are known to contain a delicate balance of both flavor-and aroma-bearing essences. This delicate balance of flavor-and aroma-bearing essences, naturally present in some food products typically gives a sensory impression of a very pleasing balance of flavor and aroma at first. However, it is very common these types of foods to rapidly develop a rancid aroma after being subjected to atmospheric conditions for a short period of time. This rapidly developing rancidity in the aroma essences often significantly impairs the beverage flavor of any beverage isolated and produced from extracts of the food product. Moreover, the compounds contributing aroma rancidity often act as catalytic agents for the rapid development of rancidity in the beverage flavor components. Therefore, while certain of the highly volatile aroma-bearing essences are extremely desirable from the standpoint of presenting a pleasing initial sensory impact. they are undesirable in the long run from the standpoint of contributing to rapid development of aroma as well as flavor rancidity.

Certain of these well known food products such as coffee, tea, and some well known fruits such as oranges, grapes, strawberries, cherries, and the like; are often processed by extraction methods to obtain concentrated extracts which can either be dried or diluted to prepare beverages. Typically, during processing to obtain extracts, the previously referred to delicate balance of aroma-bearing essences and flavor-bearing essences is upset by subjection to heat and pressure conditions necessary for an efficient extraction process. Thus, the ultimate beverage extract or dried material contains a quite different balance of flavor-and aroma-bearing essences than did the initial food product. For many years, those skilled in the art have approached this problem by attempting to remove the arombearing essences from the natural food product prior to extraction, and thereafter add the aroma-bearing essences back after the extraction procedure. In other words, the aroma essences are removed, the remaining portion is subjected to the necessary temperature and pressure conditions suitable for high extraction yields, and subsequently the aroma-bearing essences are added back. While this process has met with a large degree of success, especially in regard to coffee and tea production, it has certain inherent disadvantages. First, the aroma-bearing essences after adding back to the resulting extract are themselves often subjected to conditions during drying which bring about a substantial impairment in the flavors and aromas they produce. Secondly, the extract remaining after removal of aroma-bearing essences contains a number of natural flavor-bearing essences which are significantly impaired and changed to create unnatural flavors during the high pressure and high temperature conditions needed for the most efficient extraction.

It has now been discovered that the natural balance of aroma and flavor essences can be retained in resulting extracts by utilizing the process of this invention. In particular, the flavor-bearing essences can be separated from the aroma-bearing essences such that the resulting liquid concentrate which comprises substantially only the flavor-bearing essences is not subjected to rapid rancidity caused by incorporation of highly volatile aroma essences therein. Alternatively, a dry stable product containing both aroma and flavor essences can be prepared.

An object of this invention is to separate aroma and flavor-bearing essences from food substrates which typically contain aroma-and flavor-bearing essences such that the most volatile aroma essences do not contribute to the rapid development of rancidity in beverages produced from the food product.

It is another object of this invention to form a liquid flavor concentrate which is substantially free from highly volatile aroma-bearing essences which could, if present, rapidly develop rancidity in the resulting concentrate.

It is yet another object of this invention to provide a condensed aroma-bearing essence which, if desired, can be added back to liquid extracts or dried products resulting therefrom to provide a pleasing aroma enhancement.

It is a further object of this invention to provide a stable dry product having improved aroma and flavor properties.

These and other objects will become apparent from the following description of the invention.

SUMMARY OF THE INVENTION

This invention involves a method of separating aroma and flavor-bearing food substrates into a liquid flavor concentrate and an aroma concentrate. The liquid flavor concentrate is especially suitable for dilution to form beverages. The aroma concentrate can be added back to dried extract to provide aroma enhancement. Alternatively, the aroma and flavor concentrates can be collected in a way which inhibits deleterious interactions therebetween, mixed with a solution of suitable solids and freeze-dried to yield a stable dry product which is high in flavor and aroma.

The process involves extraction by passing wet steam either in a pulsing manner or in a slow continuous fashion, i.e. controlled to prevent flooding of the column, through a zone containing the food substrate while the zone is held under vacuum conditions. The extract thus produced is then separated into at least two fractions, one of which consists of compounds which are frozen at from about $-20°$ to $-76°$ C (i.e., freeze at or above this temperature range), and the other one consists of compounds which have freezing points below about $-20°$ C. Typically, two traps in series, one at about $-80°$ C and the second at liquid nitrogen temperatures ($-195.8°$ C) can be used to separate the fractions.

In an embodiment designed to produce a dry stable product including both aroma and flavor concentrates, the volatile aroma and flavor concentrates are captured and dissolved in a solution of suitable solids and the resulting solution is frozen and freeze-dried.

The process is especially suitable for providing a liquid coffee flavor concentrate which is substantially free from highly volatile aroma-bearing compounds which rapidly develop rancidity after subject to ambient conditions of light and heat and therefore cause unnatural beverage flavors and aromas and for producing stable dry products having strong aroma and flavor characteristics.

DETAILED DESCRIPTION OF THE INVENTION

The process of this invention is unique, not only from the standpoint of the result obtained, but also from the standpoint of the physical chemistry involved in the "extraction" process common to making both the flavor/aroma concentrates and the stable flavor and aroma bearing dry products. In reality the process is a hybrid process which combines the principles of steam distillation (wet and dry) the principles of desorption, the principles of conventional extraction, the principles of diffusion, and the principles of dissolution as well as readsorption (chromatography). In this regard, the process is uniquely different and distinguishable from prior art processes which have been applied to the production of coffee in which an aroma-bearing frost is condensed and subsequently added back to either instant coffee extract which is subsequently concentrated and dried, or added back directly to dried extract. For examples of this type of operation, see Lemonnier, U.S. Pat. No. 2,680,687, which discloses dry distillation of coffee and trapping of aroma essences at −180° C; Kline, U.S. Pat. No. 3,406,074, which shows stripping and condensing of aroma essence fractions from roast and ground coffee utilizing vacuum conditions and temperatures not in excess of 105°F; and Mook, U.S. Pat. No. 3,035,922, which discloses vacuum stripping of moist coffee grounds at temperatures within the range of 25° C to 50° C to provide an aroma frost condensed at temperatures of from 0° C to −80°C. These prior art methods which are applied specifically to coffee can be easily distinguished from the process of this invention in that none of these patents disclose substantial separation of aroma essences from flavor essences to give simultaneously a liquid flavor concentrate and an aroma concentrate; moreover, as will be evident from the following description of the invention, the prior art utilize significantly different processing conditions.

For convenience and clarity as well as succinctness, the following description of the invention is given in the context of utilizing roast and ground coffee as the food substrate; however, as heretofore explained and as will be especially evident from an examination of the Examples, this process has a wider utility than use for coffee only, and can be applied to many food substrates including those previously mentioned, as well as vegetables such as potatoes and many others.

Roast and ground coffee is charged into the substratecontaining zone which, if desired, can be an extraction column. In making separate flavor and aroma concentrates, the substratecontaining zone, i.e., the roast and ground coffee column, is subjected to extraction with cold wet steam and the extract is separated into at least two portions, the first portion being a flavor concentrate and consisting of compounds which are frozen at temperatures of from about −20° C to about −76° C (i.e., freeze at or above this temperature range), and the second portion being an aroma concentrate which consists of compounds freezing between about −20° and −200° C. The extraction is carried out under a vacuum as will hereinafter be described. Preferably, prior to the commencement of the process of this invention, the system is purged of oxygen by flooding the entire system with an inert gas. This flushing of the system with an inert gas prior to commencement of the process of the invention is preferred in order to remove oxygen from the system because oxygen within the system contributes to the rapid development of impaired flavor and aroma.

While not critical to the process but preferred from the standpoint of development of the best flavor and aroma concentrates, the food substrate can, prior to treatment by the process of this invention, be subjected to freezing, e.g., by liquid nitrogen. Such freezing of the food substrate is preferably done prior to any size reduction which may be required to minimize the formation of free radicals in the size reduction step as these can deteriorate subsequently separated aroma and flavor concentrates. Free radical formation in the absence of substrate freezing can occur during typical mechanical stress actions such as grinding, flaking, and other size reduction techniques.

According to the process of this invention extraction is accomplished by wet steam which is passed either in a pulsing fashion or a slow continuous fashion through the roast and ground coffee. It is important to note that the wet steam must be passed slowly, i.e. pulsed or slow continuous addition, through the roast and ground coffee-containing zone; for, in the event that the wet steam is allowed to rapidly flood the entire roast and ground coffeecontaining zone the flavor constituents and the aroma constituents are not adequately separated. In addition, where rapid wet steam introduction has been attempted it has been found that no liquid flavor concentrate of satisfactory flavor is obtained. While not critical, it is preferred in order to carry color-forming bodies and color precursors through the system that the process be carried out in a downward fashion. However, as hereinafter explained, upward introduction of wet steam may also be employed.

According to the process, the roast and ground coffee is subjected to wet steam in a pulsing or slow continuous fashion. Of course, the process can be carried out by an alternation of pulsing and continuous introduction of steam if desired. Both the use of wet steam and the slow introduction by either pulsing or continuous methods are critical to the process of this invention. As mentioned, if the entire column becomes flooded with water, no satisfactory separation into a liquid flavor concentrate and an aroma-bearing concentrate will occur. Moreover, if the column becomes entirely wetted during the initial stages of the process, the process merely becomes a cold extraction process with the result being a conventional extract liquor as opposed to a liquid flavor concentrate which has unique stability because most of the highly volatile aroma-bearing constituents having a great propensity for staling are removed therefrom.

In typical practice wet steam per se is not directly introduced into the column, but rather hot water is employed. However, because of the vacuum conditions employed within the column, the water rapidly evaporates to provide cold steam. Since the food substrate zone is usually cooled prior to introduction to the extraction column, some of the steam rapidly condenses on the food substrate. It is in the context of this description that the term "wet steam" is used herein.

Turning first to a description of the manner in which the preferred method of pulsing downward with wet steam is accomplished, hot water near 100° C is introduced into the top of the roast and ground coffee-containing zone. For reasons previously explained, the water rapidly evaporates to provide cold (about 20°C) wet steam. The first pulse should comprise only a sufficient amount of steam to wet a first small portion of the column. Generally, this will comprise a first one-tenth to one-eighth of the column. When the first steam pulse is introduced it rapidly comes into contact with the roast and ground coffee which is usually at lower temperatures than the steam. Immediately upon contact with the steam the most highly volative aroma materials are desorbed from the substrate and by operation of gravity, the influence of the vacuum, and as hereafter explained in more detail, the continual sparging in a downward manner by an inert gas where such is employed, are carried downward through the column. It is there most highly volatile aroma-bearing materials most often contribute to the rapid rancidity of flavor and aroma concentrates and thus it desirable that they be removed immediately.

Once the first pulse of steam hits the food substrate and the most highly volatile materials are desorbed as previously described, the steam condenses onto the surface of the coffee particles and begins to soak into the particles. This in turn causes more gas desorption and likewise these aroma-bearing essences are driven down further into the column. Finally, the water saturates the outermost portions of the particle and, because of the vacuum conditions, water begins to evaporate from the outside of the particle and form cold steam. In this manner, the water-soluble flavor constituents are transported to the outer particle surface from which they can be stripped away with the next pulse of wet steam. The substrate downstream from the interface is preferably maintained at temperatures sufficient to avoid recondensing these stripped materials.

After subjection to the first pulse of wet steam, there will be a readily visible interface between the dry coffee particles which have not been subjected to cold wet steam and those particles which have been subjected to cold wet steam. This interface will comprise in appearance a dark color band because of the presence of color-bearing bodies. With each succeeding pulse, the band gradually moves downward through the column and the entire process of cold stream desorption of highly volatile materials, water soaking and further desorption of slightly less volatile materials, water evaporation towards the surface of the particles, and cold steam stripping to carry flavor concentrates further down the column will again be repeated.

Subjection to pulsed cold wet steam in this manner is continued until "breakthrough". As used herein, break-through is defined as that point in time at which the first flavor concentrate band has reached the bottom of the column.

Separation and collection of the flavor and aroma concentrates can be done by any suitable technique such as distillation, with rectification if desired, and subsequent condensation. Such distillation should take place at pressures sufficient to allow condensation at temperatures not exceeding about 10°C. To achieve these conditions, a pump can be used to both draw a vacuum on the substratecontaining zone and discharge the extract under pressure to the distillation apparatus. Alternately, and as described hereinafter, two "cold traps" in series (one at about −20° to −76° C and the second at about −200° C) are preferably used as this allows the aroma concentrate to be collected as a stable frost.

Prior to breakthrough, a nearly colorless frost is collected in the first trap. The colorless frost is comprised largely of water-soluble alkaline and neutral aromatic materials as well as aromatic phenolic and/or acidic materials. This first colorless frost can be either discarded or, if desired, subjected to the process of U.S. Pat. No. 3,579,340, issued on May 18, 1971, which is commonly owned by the assignee hereof, and entitled "Isolating Acidic Materials from a Thin Film Evaporate." Once subjected to the process of the previous patent, the colorless frost is separated into acid flavor-laden fractions which can be added back to conventional spray-dried instant coffees to enhance their aroma and flavor.

Once breakthrough has occurred a liquid flavor concentrate will be collected in the first trap. This liquid flavor concentrate is unique and different from ordinary extract concentrates in several respects. First, the liquid flavor concentrate is highly stable; this is so because the highly unstable volatile aromatic essences have been removed therefrom. Secondly, the liquid flavor concentrate has been prepared by using very low temperatures compared to conventional extraction temperatures and therefore contains different flavor constituents. Third, the liquid flavor concentrate can be, without further treatment, diluted to give a flavorful beverage of excellent quality and flavor stability.

After breakthrough has occurred the vacuum conditions in the column can be maintained until the top portions of the charged roast and ground coffee zone are again substantially dry and pulsing of wet steam can continue in the manner previously described. Pulsing is continued until the gradually downward moving band of flavor concentrate is substantially free of color-bearing bodies. At this point the band, in speaking with reference to roast and ground coffee, becomes light tan in color and this indicates that most of the color-bearing bodies, color-bearing body precursors, and flavor materials have been removed. At this point the column is discharged and a new charge of roast and ground coffee is introduced and the process repeated.

Simultaneously with the collection of a liquid flavor concentrate in the first trap, highly volatile materials pass through that first trap without condensing and are carried to the second trap which is held at liquid nitrogen temperatures. In this second trap an aroma-bearing concentrate is collected as a frost.

Preferably the process of this invention is carried out while the entire system is subjected to sparging at about 0.05 to 5 SCFH and preferably about 0.5 SCFH per square foot of column area (transverse to the flow) with an inert gas. The inert gas can be nitrogen, argon, helium, freon or others. Preferably the inert gas is a combination of nitrogen and carbon dioxide in ratios of from about 1:9 to 9:1 which surprisingly provides a flavor enhancing effect in the subsequently separated flavor concentrate. This sparging feature aids in conveying the flavor-and aroma-carrying bodies through the column. Where the column is being sparged in this manner with an inert gas including at least some carbon dioxide, carbon dioxide will condense along with aroma concentrate in the second trap. In this case carbon dioxide, or other inert gas having a freezing point between the temperature of the two traps, will solidify along with the aroma-bearing materials in the form of an aroma-$CO_2$ frost matrix in the second trap. This is highly desirable because the carbon dioxide will act as a diluent and protecting medium for the highly reactive aroma-bearing materials by separating portions of the aroma concentrate from each other. This is advantageous because it allows maintaining the aroma concentrate in a relatively stable condition which prevents internal chemical reaction between different portions of the concentrate. Once such interaction is commenced (as it can be even by light) it will carry through the entire aroma concentrate in an autocatalytic fashion and rapidly develop rancidity.

The collected aroma concentrate frost (with or without $CO_2$) can be removed from the second trap and overlaid with coffee oil and subjected to ambient conditions. Any carbon dioxide will rapidly sublime while the temperature is slowly rising, leaving a highly aromatized coffee oil which can be utilized to add back to conventionally prepared dry instant coffees. Alternatively the solid aroma-$CO_2$ frost can be mixed with frozen coffee oil, size reduced to a fine powder, an exposed to ambient conditions to provide an aroma-enriched coffee oil.

Another unique feature of the process of this invention is that the liquid flavor concentrate flavor can be carefully controlled to produce a concentrate which is either very mild in flavor, brew-like in flavor, or harsh and stringent in flavor characteristic of very strong beverages. This is accomplished by carefully controlling the grind size of the food substrate contained in the column, as well as the temperature within the column.

In particular, it has been found that liquid flavor concentrates of very mild flavor qualities are obtained where the column is held at a temperature of from 0° C to 60° C (the temperature of the substrate rapidly approaches the temperature at which the column walls are held), and the food substrate, in this case roast and ground coffee, is ground to a very fine grind size. As utilized herein, the term "very fine grind size" is intended to mean a grind size of less that 20 mesh U.S. Standard sieve. If, on the other hand, the object is to develop a unique brew-like flavor, it has been found that the grind size of the roast and ground coffee contained in the column should be a medium grind (from 9 mesh U.S. Standard Sieve to 48 mesh U.S. Standard Sieve), and the temperature of the roast and ground coffee contained in the column should be controlled such that is from 30° to 60° C. Still further, if the object is to produce a liquid flavor concentrate of very strong harsh or even astringent flavor, the grind size should be very coarse (greater than 7 mesh U.S. Standard Sieve) and the roast and ground coffee contained with the column should be a temperature of from 60° to 95° C. If a blend of each of these flavor effects is desired, a grind gradient can be employed beginning with coarser grind particles at the top of the column, medium grind in the middle portion, and fine grind near the bottom providing the process is conducted in a downward fashion. Additionally, grind gradients help eliminate channeling problems.

A still further unique feature of the liquid flavor concentrate produced by the process of this invention is that the yield of beverage produced from the liquid flavor concentrate is equal to and in most cases excels the yield from either roast and ground coffee brewing or conventional instant coffee preparation. 100 grams of brewing roast and ground coffee typically give 15 cups (1 cup equalling 150 ml) of satisfactory beverage; instant coffee produced from 100 grams of roast and ground coffee traditionally gives 20 cups of beverage. The process of this invention will provide a liquid flavor concentrate which can be diluted to provide at least 20 cups per 100 grams, and more normally, from 25 to 30 cups, and in some instances, as many as 35 cups per 100 grams. Of course, in addition to the beverage yield the process also provides an aroma concentrate.

It is essential to the process of this invention that the vacuum pressure at the interface of the wet steam zone and the dry roast and ground coffee be from 0.1 mm to 200 mm of mercury, and most preferably, from 0.1 mm to 30 mm of mercury. Where pressures greater than 200 mm of mercury absolute are employed, insufficient cold wet steam exists to provide a liquid flavor concentrate of satisfactory qualities. The minimum pressure is given herein as a practical lower limit only.

Of course, the amount of dilution of the liquid flavor concentrate required to make a satisfactory beverage will be dependent upon the precise conditions employed in running the process as well as how long the process was run. That portion of the flavor concentrate band collected in the first trap immediately after breakthrough is most concentrated, and that portion collected after continually running the process for a period of time is least concentrated.

In further regard to the process of this invention, it should be mentioned that while the specific description given herein is of batch processing, semicontinuous and continuous processing can also be employed. Further, while a specific description has been given of the preferred downward pulsing method of wet steam desorption, it is possible to employ upward pulsing desorption, downward slow continuous desorption, upward slow continuous desorption as well as horizontal and slanted flow desorption processes. Of course, where upward desorption is employed, the vacuum must be pulled in a generally upward direction. Additionally it is preferable to employ a screen or other retaining device at the top of the column to allow easier collection of the flavor concentrate.

As heretofore mentioned, where continuous as opposed to pulsed wet steam introduction occurs, it is essential that the introduction be slow continuous introduction. For reasons mentioned heretofore with regard to the pulsing method, flooding of the column prior to breakthrough is undesirable, and if rapid continuous steam introduction is employed flooding will occur. As a general guideline, where slow continuous introduction of wet steam is employed, the amount of added steam over the entire time period prior to breakthrough should be no greater than in the pulsing method.

The substrate-containing zone, in most instances a column, can be of any suitable geometric shape but preferably is cylindrical, and for best results is between about 1 inch and 7 feet, and most preferably is from 1 to 4 feet in length. With lengths over about 7 feet, coarser grinds must generally be used which results in reduced yield and harsher less preferred flavors. Where columns longer than 4 feet are employed it is preferable to use a pressure at the steam inlet of the column which is higher than that required at the interface to push the interface between the wet steam and the dry beans down the column. In this variation, vacuum conditions of about 0.1 mm to 200 mm of mercury still exist at the interface. Care should be taken to use suitably high inlet steam or water temperatures to avoid the formation of a total water slug. Such "pressure" application at the steam inlet also can be used to reduce extraction time (i.e., increase the rate of interface migration).

Many variations will be readily apparent as to the manner of employing the liquid flavor concentrate. If desired, it can be packaged in a suitable dispenser and sold as a liquid concentrate, it can be carefully freeze-dried, it can be freeze-concentrated and therafter freeze-drid or spray-dried, it can be used as a beverage flavor concentrate, as an additive to candies and chocolate flavors, and as an additive to chocolate beverages, for preparation of cold or iced coffee beverages both carbonated and non-carbonated as well as hot and cold beverages. In further regard to dispenser use, one suitable use which employs both the flavor concentrate and the aroma concentrate is to employ a dual dispenser which simultaneously dispenses flavor concentrate and aroma concentrate around the flavor concentrate stream. This provides an aromatized beverage and a room aroma of fresh ground coffee.

The following Examples are offered to illustrate the process of this invention as the invention is applied to various food substrates, in particular coffee, tea, strawberries, oranges, and peanuts to make separate flavor and aroma concentrates therefrom.

EXAMPLE I

A coffee column having a width of 5 inches and a length of 6 inches was placed in communication with two in-line condensing traps. The first trap was held at −76° C by dry ice. The second trap was held at −195.8° C by liquid nitrogen. A vacuum pump was connected to the system to allow the employment of vacuum pressures during operation.

900 grams of roasted coffee beans were frozen in liquid nitrogen and ground to a fine grind size, i.e., less than 20 mesh U.S. Standard Sieve. In order to purge the system of oxygen, ten grams of solid carbon dioxide was placed on the beans and allowed to sublimate and be carried through the system to displace oxygen. The roast and ground coffee was placed in the column; in this and the following examples, except where otherwise noted, water at 90°–100° C was introduced to produce wet steam which was pulsed downward through the column zone under the conditions shown:

TABLE I

| Time | Temp. °C | Vacuum MM | Water Addition |
|---|---|---|---|
| (start) 11:00 | — | 3 | 400 ml. |
| 11:05 | 50° | 0.6 | (Total) |
| 11:10 | 42° | 0.5 | 100 |
| 11:15 | 60° | 0.5 | 400 |
| 11:25 | 50° | 0.5 | 400 |
| 11:40 | 45° | 0.5 | 200 |
| 11:55 | 45° | 0.5 | 300 |
| 12:00 | 47° | 0.5 | 200 |
| (stop) | | | |

The cold wet steam was passed in a downward manner through the column in a pulsing fashion and introduced at approximately two minute intervals in approximately equal amounts. The quantities listed in the table indicate the total amount of steam (water) which was introduced between the successive times for which data was taken. The column was held at the above indicated temperatures by a water jacket. At 11:10 a dark nearly black band of materials was evident in the uppermost portions of the column. During the run this band continually moved downward through the column prior to breakthrough. Prior to breakthrough, a colorless frost was collected in the first trap and was removed. Thereafter a liquid flavor concentrate was collected in the first trap and by the time the run was stopped (short of ultimate yield) a total of 775 ml of this dark nearly black colored liquid flavor concentrate was collected. The concentrate had a very pleasant coffee odor and when 15 ml of this liquid flavor concentrate was mixed with hot tap water (150 ml) a pleasant coffee flavor and odor-containing beverage was produced. The flavor was noted as characteristic of that of mild high grown coffees. The liquid flavor concentrate was allowed to stand under ambient conditions for periods of 5 and 15 days and, when examined, continued to have a pleasant flavor and aroma and produced an excellent mild and somewhat brew-like beverage upon dilution.

Simultaneously with the collection of a liquid concentrate in the manner above mentioned, the second trap which was held at liquid nitrogen temperatures provided a solidified aroma frost which comprised coffee aroma and carbon dioxide solidified into an aroma-$CO_2$ matrix. This aroma—$CO_2$ matrix was placed in 40 ml of expressed coffee oil (which was purified by the process of copending U.S. Pat. No. 3,704,132 (which is commonly owned by the assignee hereof) and allowed to equilibrate until all of the $CO_2$ had sublimed. The coffee oil was noted to contain an excellent coffee-like aroma and when placed upon conventionally spray-dried instant coffee at a 0.2% by weight level significantly enhanced the aroma of the product.

Equivalent results to those shown in this Example are obtained when the example is duplicated using a slow continuous wet steam addition as opposed to pulsing. The same amount of steam was employed in the continuous process as employed in the pulsing addition shown herein.

EXAMPLE 2

The procedure previously described in Example 1 was employed. The total amount of roast and ground coffee ground to a grind size of from 20 mesh U.S. Standard Sieve to 48 mesh U.S. Standard Sieve was 1,200 grams. The entire system was purged of oxygen by placing a small amount of dry ice within the system prior to commencement of the process. The process was operated utilizing the conditions given in the following Table:

TABLE II

| Time | Temp. °C | Vacuum mm | Water Addition |
|---|---|---|---|
| 1:40 | 55 | 0.5 | 600 ml |
| 1:45 | 55 | 0.5 | 400 ml |
| 1:50 | 55 | 0.5 | (Total) |
| 1:55 | 55 | 0.5 | 500 ml |
| 2:10 | 55 | 0.5 | 700 ml |
| 2:15 | 55 | 0.5 | 800 ml |
| 2:25 | 55 | 0.5 | 500 ml |

Prior to breakthrough, a colorless frost appeared in the first trap and was removed. Thereafter, while downward steam pulsing continued as shown in the Table, a dark black band was noted to be present in the column and gradually moving downward at the interface of the wet steam and dry beans. The total amount of liquid flavor concentrate collected in the first trap was 1,900 ml. The trap was kept at −76° C by a dry ice acetone bath. The second trap was cooled to liquid nitrogen temperatures and simultaneously with the collection of the liquid flavor concentrates an aroma and carbon dioxide frost solidified in this second trap.

The highly volatile aroma portion collected in the second trap was added to the liquid flavor concentrate collected in the first trap and, while the initial aroma impact was significantly increased, it was noted that within 10 minutes the flavor as well as aroma of the flavor concentrate rapidly developed a stale rancid note. The flavor changes were noted to continue with increasing time. It was therefore concluded that the mere addition of the highly volatile aroma materials from the solidified aroma—$CO_2$ frost to the liquid flavor concentrates was undesirable because the highly volatile compounds rapidly decomposed and thereafter acted as catalytic agents to rapidly degrade the pleasant odor and flavor of the liquid flavor concentrate.

EXAMPLE 3

Utilizing the procedure shown in Example 1, two pounds of frozen strawberries were subjected to the process of this invention. Prior to commencement of the process 20 grams of powdered carbon dioxide was added to the system to purge the system of oxygen. The process was conducted utilizing the following conditions:

TABLE III

| Time | Temp. ° C | Vacuum mm | Water Addition |
|---|---|---|---|
| 2:00 | 0 | 0.2 | 100 ml |
| 2:10 | 22 | 0.2 | (Total) |
| 2:15 | 40 | 0.2 | 300 ml |
| 2:35 | 23 | 0.2 | 300 ml |
| 2:50 | 25 | 0.2 | 100 ml |
| 3:00 | 25 | 0.2 | 200 ml |
| 3:10 | 35 | 0.2 | 200 ml |

Prior to commencement of the process, the frozen strawberries were ground to a grind size of 7.

In this instance, while pulsing of the steam occurred in a downward manner, as previously shown, the color band which gradually moved downward through the column at the interface of the wet steam and the "dry" strawberries, was noted to be a deep crimson red in color. The aroma-$CO_2$ matrix collected in the liquid nitrogen trap was noted to contain a very pleasant but not particularly intense strawberry aroma. The liquid concentrate which was collected subsequent to breakthrough in the first trap, which was held at −76° C by a dry ice acetone bath, was noted to have a very intense strawberry flavor and a mild strawberry aroma. The color of the band continually decreased after breakthrough, and by 3:10 when the process was stopped, the band was only a very pale pink in color.

The liquid flavor concentrate upon storage was noted to be stable and did not develop any rancid odors. In addition, the liquid concentrate when diluted using 20 ml of concentrate and 80 ml of water, was noted to provide a very pleasant strawberry flavored beverage.

EXAMPLE 4

Utilizing the procedure shown in Example 1, peeled frozen oranges which had been frozen in liquid nitrogen and finely ground to a mesh size of 7 were placed in the column. 25 grams of carbon dioxide were placed in the system and allowed to sublime to purge the system of oxygen. During operation of the process of this invention, the system was continually flushed in a downward manner with carbon dioxide. The process was run utilizing the following conditions:

TABLE IV

| Time | Temp. ° C | Vacuum mm | Water Addition |
|---|---|---|---|
| 1:20 | 25 | 0.3 | 300 ml |
| 1:30 | 13 | 0.3 | (Total) |
| 2:00 | 18 | 0.3 | 100 ml |
| 2:30 | 19 | 0.3 | 100 ml |
| 3:00 | 30 | 0.3 | 100 ml |

400 ml. of liquid flavor concentrate was collected in the first trap subsequent to breakthrough. The band which continually moved downward through the column as pulsing of the wet steam occurred was noted to be a bright, very intense orange in color. At 3:00 when the process was stopped the substrate remaining in the column was noted to have only a very slight orangish color. The liquid flavor concentrate was very pleasant in orange aroma and when diluted to 150 ml by the addition of 75 ml of water to 75 of the liquid flavor concentrate, gave an excellent orange flavor beverage which did not develop any notable staleness or rancidity after 5 hours of continual subjection to ambient conditions.

The liquid nitrogen trap contained a very pleasant but not especially intense orange aroma—$CO_2$ matrix.

EXAMPLE 5

310 grams of unsalted peanuts were frozen in liquid nitrogen and crushed quickly to an estimated particle size of 20 mesh U.S. Standard Sieve screen. The peanuts were processed as described in Example 1 utilizing the following conditions:

Table V

| Time | Temp. ° C | Vacuum mm | Water Addition |
|---|---|---|---|
| 10:05 | 22 | 0.8 | 200 ml |
| 10:10 | 40 | 0.4 | (Total) |
| 10:15 | 30 | 0.4 | 300 ml |
| 10:30 | 30 | 0.4 | 200 ml |

As in the case of the above and following Examples, the column wall was maintained at temperatures within the above described range by a cold water jacket which surrounded the column.

475 ml of liquid flavor concentrate was collected in the first trap. The band which continually moved down through the column as pulsing of cold wet steam in a downward fashion occurred was dark tan in color. The liquid flavor concentrate collected after breakthrough was noted to have a very pleasant peanut odor and was found to be suitable for flavor and aroma enhancement of dry peanuts by spraying small amounts thereon. The aroma matrix collected in the second trap which was held at liquid nitrogen temperatures was found to be very strong in peanut aroma.

The peanut liquid flavor concentrate was found to be desirable to add to food products where peanut flavor was desired; for example, in cake mixes, brownie mixes, and the like. The aroma—$CO_2$ frost when transferred to peanut oil and placed upon dry salted peanuts was found to provide an enhanced peanut aroma.

EXAMPLE 6

An apparatus similar to that used in Example 1 was employed. However, in this Example since upward steam pulsation was employed, the in-line condenser traps were in communication with the top portion of the column, and the column was continually sparged from the bottom upward with nitrogen gas. The vacuum was drawn from the top of the column. Near the top portion of the column a perforated Plexiglas plate fitting the diameter of the column was placed on top of the bed of food substrate.

Two thousand grams of roasted coffee beans were frozen in liquid nitrogen and ground to a fine grind size of less than 20 mesh U.S. Standard sieve screen. The roast and ground coffee was placed in the column and wet steam was pulsed upward through the column zone under the following conditions:

TABLE VI

| Time | Temp. ° C | Vacuum mm | Water Addition |
|---|---|---|---|
| (start) 10:55 | 70 | 0.2 | 3250 ml |
| 12:00 | 75 | 0.3 | (Total) |
| 1:00 | 75 | 0.3 | 1550 ml |
| 1:05 | 78 | 0.3 | 600 ml |
| 2:30 (stop) | 78 | 0.3 | 3600 ml |

The cold wet steam was passed in an upward manner through the column in a pulsing fashion as indicated by the above Table in increments as described in Example 1. The column was held at the above indicated temperatures by a water jacket. While upward steam pulsing continued as shown in the Table, a dark black band was noted to be present in the column and gradually moving upward at the interface of the wet steam and the dry beans. After breakthrough occurred, 1650 ml of liquid flavor concentrate was collected in a first trap. The trap was held at −76° C by a dry ice acetone bath. The second trap was cooled to liquid nitrogen temperatures and simultaneously with the collection of the liquid flavor concentrate an aroma concentrate solidified in the second trap.

Thereafter the liquid flavor concentrate was utilized to make samples of coffee beverage substantially indistinguishable from fresh brewed coffee. The procedure employed in making the beverage was identical to that shown in Example 1.

EXAMPLE 7

The procedure shown in Example 1 was repeated utilizing 906 grams of orange and black pekoe tea blend as the food substrate. The tea was placed in the column and wet steam was pulsed downward through the column under the following conditions:

TABLE VII

| Time | Temp. ° C | Vacuum mm | Water Addition |
|---|---|---|---|
| (start) 10:37 | 63 | 0.1 |  |
| 10:43 | 59 | 0.1 | 800 ml |
| 11:05 | 60 | 0.1 | (Total) |
| 11:35 | 60 | 0.1 | 1000 ml |
| 12:07 | 60 | 0.1 | 1000 ml |
| 1:05 | 60 | 0.1 | 800 ml |
| 2:10 | 60 | 0.1 | 1800 ml |
| 2:35 | 60 | 0.1 | 1800 ml |
| 3:00 | — | — |  |
| & (stop) |  |  |  |

At 10:40 time a dark colored band of materials was evident in the uppermost portion of the column. The band continually moved downward through the column at the interface of dry tea and the wet steam. Before breakthrough a colorless frost was collected in the first trap and was removed. A total of 4955 ml of liquid flavor concentrate was collected in the first trap after breakthrough. The flavor concentrate had a very pleasant tea odor, and when diluted provided tea beverage of excellent quality. The flavor concentrate was freeze dried and yielded 275 grams of solids, a 30.4% yield.

In addition to the dry product produced by drying (e.g., freeze drying) the flavor concentrate, a stable dry product of unique character can be produced based on the aforedescribed extraction process by the use of the variation which will now be described. As has been indicated, the first materials to be collected upon extraction of the substrate are the highly volatile bodies which tend to coreact and produce undesirable character in the product if left in the liquid state for times in excess of about 30 minutes. To avoid the undesirable interaction, as discussed hereinbefore, the aroma and flavor bodies can be held in one or more low temperature traps or added to a coffee oil carrier.

To make a suitable stable dry flavor and aroma bearing product incorporating the aroma/flavor frost (with or without $CO_2$), such frost is first mixed at a low temperature with a solution of suitable solids then frozen and freezedried. The solids which are added to the frost provide a separating and supporting matrix for the flavor and aroma bodies in the dry product in somewhat the same manner as does the $CO_2$ matrix in a frost which includes $CO_2$.

Collection of the "frost" is, as mentioned, preferably done in a single condenser which is maintained in the temperature range of from about −20° C (and preferably below −76° C which is the minimum temperature for condensing the $CO_2$) to about −196° C (i.e., liquid nitrogen temperature). In general, working at or about liquid nitrogen temperatures is preferred to assume that substantially all of the flavor and aroma bodies are condensed; lower temperatures appear to condense no additional desirable flavor and aroma bodies. Separate traps can be used if desired but are not necessary and therefore represent an unnecessary complication to the process.

Suitable solids which can be added, in solution form, to the frost include a broad range of materials which typically will be carbohydrates such as saccharides, oligosaccharides, hydrolyzed cellulose, cereal extracts, starches, etc., or proteins. One particularly suitable solid is conventionally prepared soluble solids from the same or same type of substrate which was extracted to yield the aroma/flavor frost product. Using coffee as an example, conventionally prepared instant coffee solids, decaffeinated instant coffee solids or the product of subsequent hydrolysis of the substrate from which the aroma and flavor has been removed are particularly suitable. A convenient way to produce a hydrolyzed product for addition to the flavor/aroma frost is by slurry extraction of the substrate, after the removal of the volatile flavor and aroma bodies (which are collected as frost in the present invention) and the afore-described flavor concentrate (i.e., the liquid removed from the column after breakthrough) therefrom, by conventional techniques. Coffee flavor/aroma frost can also be added to cereal solids to make a coffee-like product or to milk solids to make a dry coffee with "cream" product. Obviously, a similar broad range of solids can be admixed with flavor/aroma frosts from substrates other than coffee.

Sufficient solids must be provided to matrix the flavor and aroma in the frost. In general, when using a $CO_2$ surge and a single trap, 100 grams of finely ground coffee substrate will produce about 2 grams of flavor/aroma frost of which about 1,800 mg will be water and $CO_2$. The remainder is believed to consist of a complex mixture of about 190 mg of highly acidic organic acids (such as fatty acids, citric acid, etc.) and about 10 mg of complex phenols such as chlorogenic acids and their degradation products. About 2 grams of solids are preferably added to this quantity of flavor/aroma frost; such solids should be at a concentration of 10 to 60 and preferably about 40% to minimize the amount of water which must be removed in the subsequent freeze drying. Additionally and as is well known in the art, the use of higher initial concentration of solids in a flavor and aroma containing solution to be freeze-dried results in lower losses of flavor and aroma.

If desired, lipids (e.g., coffee oil when working with coffee substrates) can also be introduced at low levels (e.g., at about 0.25% by weight of the other solids) as "solids" to stabilize the final product. While there is no wish to be bound by theory, it appears that lipids sequester the aroma and flavor bodies and provide further stability thereto.

The mixing of the flavor/aroma frost and the solids solution should be done at the lowest practical temperature; e.g., about 10° C with coffee. Of course, any $CO_2$ is driven off at the temperatures necessary to dissolve the aroma and flavor bodies in the solids solution. Preferably, the solids solution will be mixed with the frost prior to melting the mixture, thereby reducing the mixing which must be done in the liquid phase. The resulting solution should be frozen immediately to preserve the flavor and aroma.

The result of frezing of an aqueous solution of solids, such as coffee solids is crystals of essentially pure ice and crystals of water/solids solutions. As is common in freeze drying, "slow freezing" (i.e., at relatively high temperatures; about −40° C) can be used to form water(ice)/solids crystals of densities greater than those achieved with "fast" freezing. The more dense structure is desirable, as is known in the art, to minimize exposed surface area and consequently volatiles loss, oxidation, etc. Slow freezing is particularly important in the practice of the present invention since the product of the process hereinbefore described is particularly concentrated in volatile atomic bodies and therefore particularly sensitive to all processing conditions.

Subsequent to freezing, the frozen solids/flavor/aroma material is freeze-dried by conventional techniques to yield a stable solid material containing flavor and aroma at very high levels. Those freeze drying techniques which reduce the exposure time of the product to high temperatures (e.g., vibration freeze drying) are particularly preferred.

The following examples demonstrate the production of the stable dry highly aromatic flavor bearing products of the present invention:

EXAMPLE 8

A blend of coffee such as is typically used to make vacuum packed coffee was ground to a grind size of between about 30 and 48 mesh at a temperature of about −60° C (using liquid nitrogen). 10 kilograms of the roast and ground coffee and 100 grams of ground solid carbon dioxide were placed in a jacketed extraction column 12 inches in diameter and 36 inches long. The column was held under a vacuum of about 1 mm of mercury by a vacuum pump which pulled the vapors down through the column and out through a trap operating at −195.8° C. Water at about 100° C was introduced at the top of the column in a pulsing fashion (about 333 ml per pulse at two minute intervals) and flashed to wet steam once in the column. The steam condensed on the coffee particles thus wetting them. The vapors which were removed from the column condensed in the trap and after about 10 kilograms of hot water had been introduced into the column "breakthrough" occurred (i.e., brown liquid began to come from the column). Prior to breakthrough about 200 grams of aroma/flavor frost were collected in the cold trap.

Continued introduction of hot water resulted in liquid flavor concentrate of coffee solids coming from the column. This was collected separately at −76° C (although higher or lower temperatures — about 10° to −200° C — can satisfactorily be used) and yielded about 12 kilograms of mild pleasant instant coffee extract, having a pronounced pleasant aroma, at a concentration of about 17%. The liquid extract when diluted with about 25 parts of water per part of extract yielded a smooth mild cup of coffee.

1,180 grams of the above coffee extract (200 grams of solids) was added to the 200 grams of aroma/flavor frost and warmed to about 5° C, melting the same and producing a solution which was then frozen at −40° C (surrounding air temperature) and freeze dried. 25 mg of the resulting freeze dried product was added to one gram of solids resulting from freeze drying the above produced coffee extract (flavor concentrate). The mixture, when added to 150 ml of hot water, produced a cup of coffee with a strong highly aromatic and pleasantly flavorful yet non-bitter character.

EXAMPLE 9

The procedure of Example 8 was repeated except that the frost was collected in three fractions; the fraction from the first, second and third thirds of the time prior to breakthrough. The beverage produced from he first third frost was sweet and "high" in flavor and aroma character. The beverage produced from the last third of the frost was heavy and strong yet no bitter. The beverage produced from the frost from the middle third was intermediate the other two fractions.

Obviously, as indicated in this Example the process of the present invention can be adjusted to produce unique products to suit a variety of tastes.

EXAMPLE 10

Straight robusta coffee which typically produces a cup of coffee with a bitter, harsh rubbery character is roasted and ground and processed in a manner identical to Example 8. Surprisingly, a cup of coffee produced from either the flavor concentrate extract or a mixture of the flavor concentrate extract and the aroma/flavor frost therefrom have an aroma and flavor which closely resembles that achieved with the more expensive blends such as those used in Example 8.

EXAMPLE 11

The procedure of Example 8 is repeated except that all 12 kilograms of flavor concentrate (2040 grams of solids) are added to 50 grams one-fourth of the frost. This corresponds to the flavor concentrate/frost proportions in the final product of Example 8. Upon freeze drying the mixture, a dry product is produced which, when added at 1 gram per 150 ml of water produces a pleasant cup of coffee having the attributes of that produced by Example 8 but to a somewhat lesser degree. It is believed that the increased ratio of water (which is removed in the freeze drying) to aroma and flavor bodies in the frost results in additional stripping of the most aromatic and flavorful bodies.

EXAMPLE 12

50 grams of the excess frost from Example 11 is mixed with a solution of 50 grams of water soluble soybean protein and 75 grams of cold water and the mixture is frozen and freeze dried. The resulting dry product (approximately 75 grams) is added to 3000 grams of water soluble soybean solids. 1–2 grams of the resulting mixture when added to 150 ml of hot water produce a unique clear coffee-like nutritious beverage.

EXAMPLE 13

The procedure of Example 12 is repeated except that soluble decaffeinated coffee solids are used in place of the soybean solids. An improved decaffeinated coffee results and essentially no caffeine is introduced into the beverage from the aroma/flavor frost.

A superior decaffeinated product is also produced when the aroma/flavor frost is collected from decaffeinated coffee beans.

The present invention has been described in connection with a variety of specific examples; it is understood that the examples are merely description and not limiting. Many variations will occur to those in the art from the foregoing description; the invention being limited only by the scope of the appended claims.

What is claimed is:

1. A process for separating an aroma- and flavor-containing frost fraction from an aroma- and flavor-bearing substrate, said process comprising: pulsing wet steam into a zone containing an aroma- and flavor-bearing substrate in a manner which avoids flooding of said zone and while said zone is held at an absolute pressure of from about 0.1 mm to 200 mm of mercury, thereby to provide a continually moving interface between dry and wetted particles of said substrate; and prior to the reaching of said moving interface to the end of said zone and the emergence of a liquid flavor concentrate fraction from said zone, collecting an aroma-and flavor-containing frost fraction by condensing aroma and flavor bodies removed from said substrate at a temperature of from about −20° to −200° C.

2. The process of claim 1 wherein subsequent to the emergence of said liquid flavor concentrate from said zone, said liquid flavor concentrate is collected by condensing at a temperature of from about −20° C to −80° C.

3. The process of claim 2 wherein the substrate-containing zone is subjected to an inert gas sparge.

4. The process of claim 2 wherein pulsing of said wet stream continues until the flavor concentrate coming from said substrate-containing zone is substantially free of color-bearing bodies.

5. The process of claim 1 wherein said steam is pulsed in downward fashion through the substrate-containing zone.

6. The process of claim 5 wherein said substrate-containing zone is held at temperatures of from 0° to 60° C.

7. The process of claim 5 wherein the absolute pressure is from 0.1 mm to 30 mm of mercury.

8. The process of claim 5 wherein the substrate is roast and ground coffee.

9. The process of claim 5 wherein the substrate is tea.

10. The process of claim 5 wherein the substrate is a fruit.

11. The process of claim 2 wherein the substrate is a vegetable.

12. A process for producing a stable concentrated flavorful aromatic dry product from a flavor—and aroma-bearing substrate comprising: pulsing wet steam into a zone containing an aroma—and flavor-bearing substrate in a manner which avoids flooding said zone and while said zone is held at an absolute pressure of from about 0.1 mm to 200 mm of mercury, thereby to provide a continually moving interface between dry and wetted particles of said substrate; prior to the reaching of said moving interface to the end of said zone and the emergence of a liquid flavor concentrate fraction from said zone, collecting an aroma—and flavor-containing frost fraction by condensing aroma and flavor bodies removed from said substrate at a temperature of from about −20° C to −200° C; combining said aroma—and flavor-containing frost fraction with a solution of solids selected from the group consisting of proteins and carbohydrates; freezing the resulting mixture; and freeze drying.

13. The process of claim 12 wherein the weight of solids added is about equal to the weight of the aromatic and flavorful frost fraction.

14. The product of the process of claim 12.

15. The process of claim 12 wherein the solids added to the aromatic and flavorful portion of the extract are from a substrate of the same type as the substrate.

16. The process of claim 15 wherein the substrate is coffee.

17. The product of the process of claim 16.

18. The process of claim 16 wherein the solids are decaffeinated coffee.

19. The process of claim 16 wherein said solids are extracted from the same substrate which yielded the aromatic and flavorful frost fraction 20. The process of claim 19 wherein the substrate comprises Robusta coffee.

21. The process of claim 19 wherein said substrate is decaffeinated coffee.

22. A process for separating an aroma—and flavor-containing frost fraction from an aroma—and flavor-bearing substrate, said process comprising: slowly and continuously passing wet steam into a zone containing an aroma— and flavor-bearing substrate in a manner which avoids flooding of said zone and while said zone is held at an absolute pressure of from about 0.1 mm to 200 mm of mercury, thereby to provide a continually moving interface between dry and wetted particles of said substrate; and prior to the reaching of said moving interface to the end of said zone and the emergence of a liquid flavor concentrate fraction from said zone, collecting an aroma—and flavor-containing frost fraction by condensing aroma and flavor bodies removed from said substrate at a temperature of from about −20° to −200° C.

23. The process of claim 22 wherein said slow continuous steam introduction occurs in a downward manner.

24. A process for producing a stable concentrated flavorful aromatic dry product from a flavor-and aroma-bearing substrate comprising: slowly and continuously passing wet steam into a zone containing an aroma— and flavor-bearing substrate in a manner which avoids flooding said zone and while said zone is held at an absolute pressure of from about 0.1 mm to 200 mm of mercury, thereby to provide a continually moving interface between dry and wetted particles of said substrate; prior to the reaching of said moving interface to the end of said zone and the emergence of a liquid flavor concentrate fraction from said zone, collecting an aroma— and flavor-containing frost fraction by condensing aroma and flavor bodies removed from said substrate at a temperature of from about −20° to −200° C; combining said aroma— and flavor-containing frost fraction with a solution of solids selected from the group consisting of proteins and carbohydrates; freezing the resulting mixture; and freeze drying.

\* \* \* \* \*

UNITED STATES PATENT OFFICE
CERTIFICATE OF CORRECTION

Patent No. 3,997,685    Dated December 14, 1976

Inventor(s) Rudolf Gottfried Karl Strobel

It is certified that error appears in the above-identified patent and that said Letters Patent are hereby corrected as shown below:

| Column | Line | |
|---|---|---|
| 1 | 20 | after "common", insert -- for -- |
| 1 | 32 | after "impact", delete the period and insert a comma |
| 1 | 37 | after "like" delete the semicolon and insert a comma |
| 3 | 14 | insert a comma after "dry)" |
| 5 | 16 | "there" should be -- these -- |
| 7 | 50 | after "be" insert -- at -- |
| 9 | 5 | "therafter" should be -- thereafter -- |
| 11 | 13 | "concentrates" should be -- concentrate -- |
| 12 | 23 | insert -- ml -- after "75" (second instance) |
| 14 | 5 | in Table, delete "&" |
| 14 | 36 | "freezedried" should be -- freeze dried -- |
| 14 | 47 | "assume" should be -- assure -- |
| 15 | 47 | "frezing" should be -- freezing -- |

UNITED STATES PATENT AND TRADEMARK OFFICE
CERTIFICATE OF CORRECTION

PATENT NO. : 3,997,685

DATED : December 14, 1976

INVENTOR(S) : Rudolf Gottfried Karl Strobel

It is certified that error appears in the above-identified patent and that said Letters Patent are hereby corrected as shown below:

| Col. | Line | |
|---|---|---|
| 15 | 48 | insert a comma after "solids" |
| 16 | 57 | "no" should be -- not -- |
| 17 | 10 | enclose "one-fourth" in parentheses |

Signed and Sealed this

Sixth Day of June 1978

[SEAL]

Attest:

RUTH C. MASON
Attesting Officer

DONALD W. BANNER
Commissioner of Patents and Trademarks